United States Patent [19]

Siegler, Jr.

[11] 3,924,950
[45] Dec. 9, 1975

[54] ATOMIC ABSORPTION SPECTROSCOPY WITH BACKGROUND CORRECTION

[75] Inventor: E. Horace Siegler, Jr., Darien, Conn.

[73] Assignee: The Perkin-Elmer Corporation, Norwalk, Conn.

[22] Filed: Sept. 16, 1974

[21] Appl. No.: 506,267

[52] U.S. Cl. .................. 356/82; 356/87; 356/95
[51] Int. Cl.² ..................... G02J 3/36; G02J 3/42
[58] Field of Search ............ 356/88, 89, 93, 94, 95, 356/81, 82, 85, 87

[56] References Cited
UNITED STATES PATENTS

| | | | |
|---|---|---|---|
| 3,137,758 | 6/1964 | Mason et al. | 356/81 |
| 3,689,158 | 9/1972 | Shifrin | 356/88 |
| 3,825,344 | 7/1974 | Bonne | 356/85 |

Primary Examiner—Vincent P. McGraw
Attorney, Agent, or Firm—S. A. Giarratana; F. L. Masselle; J. K. Conant

[57] ABSTRACT

An atomic absorption spectrometer which combines the advantages of double beam background correction, continuous source lamp operation, insensitivity to sample region emission, and inexpensive construction, includes a fixed beam splitter-combiner, combines radiation from a line source with that from a deuterium or hydrogen source and simultaneously splits the combined radiation into sample and reference beams. These beams are chopped ahead of the sample region and are recombined beyond the sample region by a second beam splitter-combiner. The recombined beam then goes through a monochromator and onto a detector. The resulting signal is analyzed electronically to yield background and spectral line intensities in both the sample and reference beams.

12 Claims, 2 Drawing Figures

ATOMIC ABSORPTION SPECTROSCOPY WITH BACKGROUND CORRECTION

BACKGROUND OF THE INVENTION

Atomic absorption spectroscopy is now a well known analytical technique. In this method of analysis, elements are detected by atomizing a sample as, for example, in a flame. Radiation containing a spectral line of the element being investigated is passed through the flame and the absorption of radiation at the particular wavelength is measured as an indication of the amount of the atomized element. However, other materials may also absorb or scatter light at the wavelength of interest. This can produce an erroneous analytical result and has become known as "background" absorption. Means for correcting background absorption were described by S. R. Koirtyohann and E. E. Pickett 37 *Analytical Chemistry* 601 (1965) and by B. C. L'vov in 24B *Spectrochimica Acta* 53 (1969). Those publications disclosed the addition of a hydrogen lamp which has a radiation continuum. The element of interest absorbs the wavelength line from the source lamp but practically no radiation from the hydrogen continuum. When the ratio of the two beams is taken electronically, the effect of background absorption is substantially eliminated. Background correction employing an improved continuum source, namely a deuterium lamp, is discussed in an article entitled "Background Correction in Atomic Absorption Spectroscopy" by H. L. Kahn and D. C. Manning in the August 1972 issue of *American Laboratory*. The present invention pertains to background correction utilizing any continuum source, as opposed to use of a "nearby" spectral line which is a much less satisfactory technique.

Background correction of the above type has been applied to double beam atomic absorption instruments. However, a number of problems have arisen. Extreme source stability is required when measurement depends on the ratio of two single beams each of which originates from a different source. At best, long warm-up times are needed to approach the necessary stability. Another problem arises if the source lamp is pulsed. Pulsing creates no particular problem when using hollow-cathode source lamps. However, electrodeless discharge lamps, which are often employed, operate much better when operated continuously. These lamps are operated on AC at RF frequencies. Accordingly, the term "continuously" as used here means "not pulsed." The reason for running them continuously rather than pulsed is that, to sustain the discharge, the "off" interval must often be a low (but not zero) level of discharge. The "on" interval is a higher level. Modulation, typically, is half that obtainable with an opaque shutter. However, for difficult elements, it may be 25 percent and some lamps have shown as little as 10 percent. Another problem with some known instruments is that they are sensitive to emission from the flame or other atomizing source. Finally, instruments employing reflective choppers are more expensive than would be desirable. A reflective chopper is inherently more expensive than an opaque chopper. Furthermore, due to its function as a reflector, alignment of a reflective chopper is critical, which increases both manufacturing and maintenance costs.

Accordingly, it is a primary object of the present invention to provide a double beam atomic absorption instrument having double beam background correction.

Other objects are to provide such an instrument which has a continuously operative monochromatic light source, which is insensitive to flame or sample region emission, and which does not require a reflective chopper.

SUMMARY OF THE INVENTION

The objects of this invention are achieved by means of an atomic absorption analyzer which includes means for forming a first beam of substantially monochromatic radiation and a second beam of pulsed non-monochromatic radiation which contains wavelengths adjacent that of the first beam. The radiation of the first and second beams is combined and then split into a sample beam and a reference beam which are directed, respectively, through a sample region and a reference region. The sample and reference beams are chopped prior to their entering the sample and reference regions. After leaving the sample and reference regions, the beams are recombined. Means are provided for isolating from the recombined beam a relatively narrow wavelength region which contains the wavelength related to the element of interest. The intensity of the isolated wavelength is measured at periods established by the pulse rate of the second beam and the frequency of the chopping means.

DESCRIPTION OF THE PREFERRED EMBODIMENT

Figure 1:
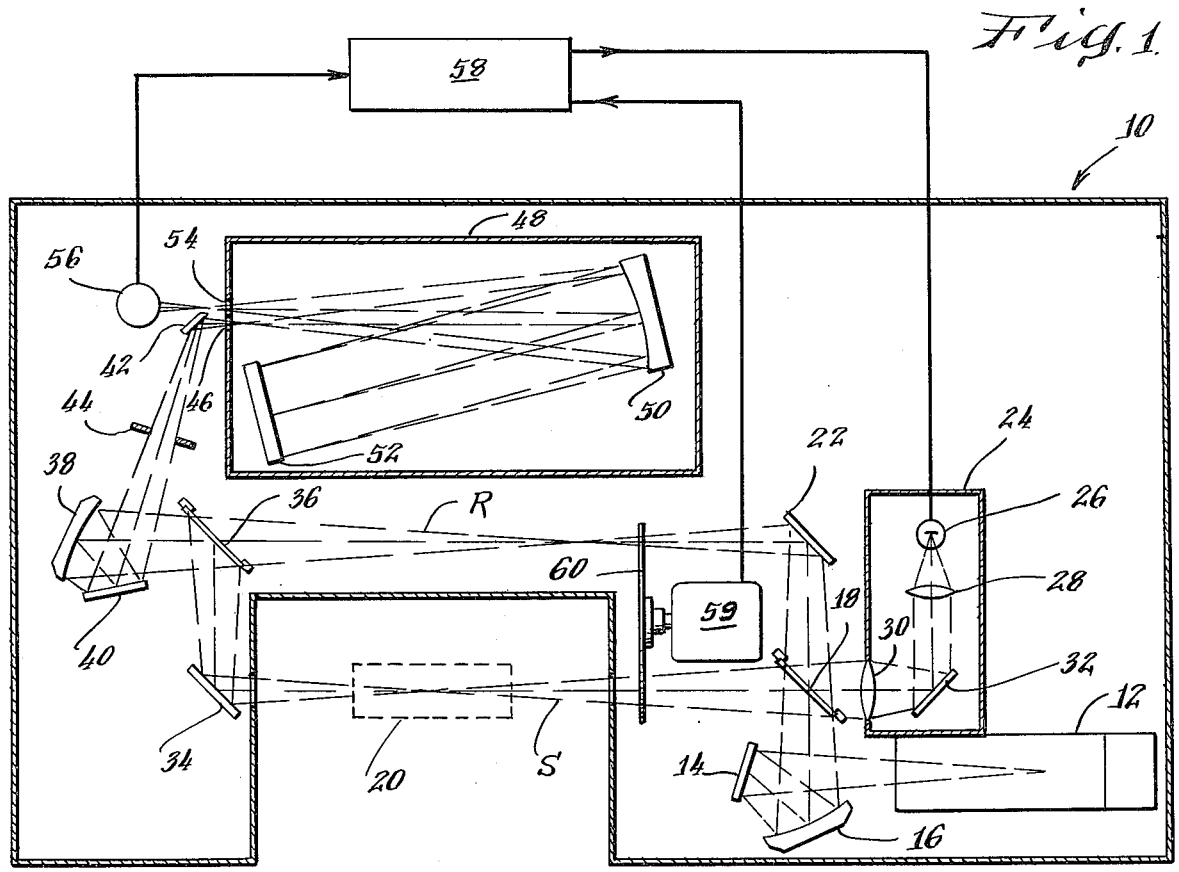
FIG. 1 is a schematic diagram of the instrument of the invention.

FIG. 1 shows an atomic absorption spectrometer 10 having a radiation source 12, such as a hollow cathode lamp or an electrodeless discharge lamp which emits a line spectrum including a wavelength of interest. Source 12 directs a beam of such essentially monochromatic radiation to a flat mirror 14 where it is redirected to a toroidal focusing mirror 16. Mirror 16 directs the radiation to a fixed beam splitter-combiner 18 which redirects a portion of the radiation into a sample beam S, a source image being formed within the sample region 20. The remaining portion of radiation continues through the beam splitter-combiner 18 to a flat mirror 22 which forms a reference beam R parallel to, but displaced from, the sample beam.

A background corrector 24 comprises a deuterium lamp or other continuum source 26, leanses 28, 30, and flat mirror 32. The radiation continuum from lamp 26 includes the wavelength of interest. This assembly directs the radiation from lamp 26 onto the beam splitter-combiner 18 where a portion passes through and combines with sample beam S and is focused at the same point within sample region 20. The remainder of the radiation continuum is reflected from the beam splitter-combiner 18, which passes the reference portion of the radiation from source 12; this combined beam from the splitter-combiner 18 is then redirected by mirror 22.

After passing through the sample region 20, the sample beam is reflected from a flat mirror 34 onto a second fixed beam splitter-combiner 36 which is also positioned in the reference beam R. The sample and reference beams are thereby recombined and a toroidal mirror 38 redirects the radiation through a pupil stop 44, and by means of flat mirrors 40, 42 directs the beam to an image at the entrance slit 46 of a monochromator 48. Monochromator 48 operates in the usual manner by means of a collimating mirror 50 and grating 52 to isolate a narrow band of wavelengths and to form an image at exit slit 54, the radiation passing through the exit slit falling on photomultiplier 56. The electrical signal from photomultiplier 56 passes to electronic logic circuitry 58, which operates in a manner subsequently described, to pulse the continuum source lamp 26. A motor 59 drives an opaque chopper 60, which is positioned to interrupt both the sample and reference beams prior to their passing into the sample and reference areas, and control means associated with the chopper, such as holes in the chopper blade and a light source and photodetector on opposite sides of the chopper blade, or other optical or mechanical sensing means, direct control signals to the logic circuitry 58 for controlling the pulsing of the lamp 26 and the electronic sampling times of the logic circuitry 58, as by actuating conventional electronic gating elements in the logic circuitry.

The chopper is arranged to operate in the following sequence:
1. Block both sample and reference beams;
2. Open sample beam;
3. Block both sample and reference beams;
4. Open reference beam.

As they fall upon the chopper blade, both the sample and the reference beams include continuous monochromatic light from source 12 and a pulsed radiation continuum from deuterium lamp 26. Only the radiation in the sample and reference beams is chopped and radiation emanating from sample region 20 reaches the photomultiplier in unchopped form.

Figure 2:
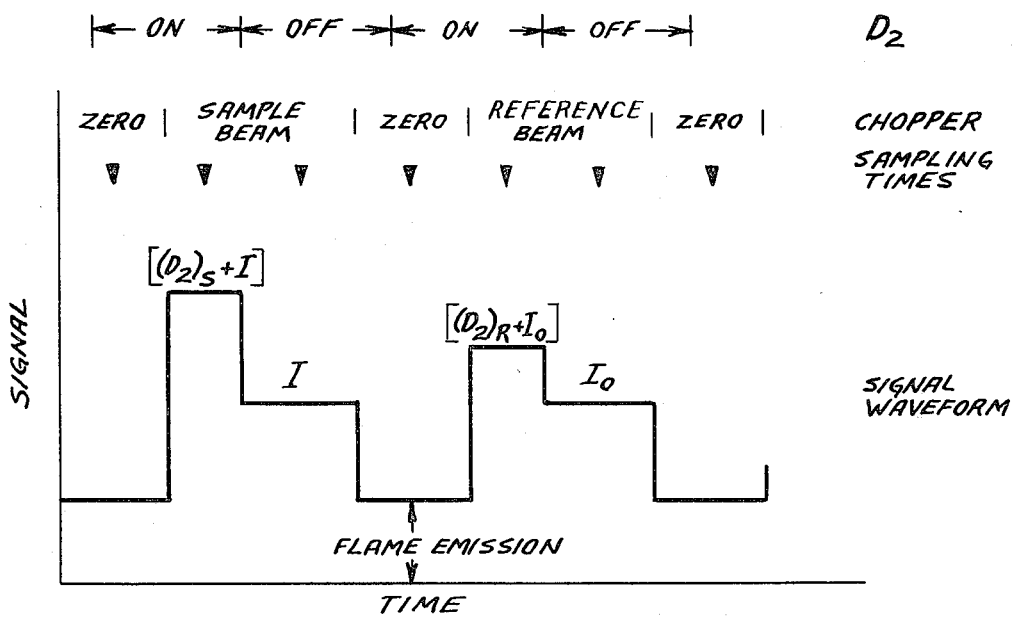
FIG. 2 is a diagram illustrating the sampling sequence and signal waveform output of the instrument of the invention.

FIG. 2 illustrates the operation of the spectrometer of this invention and is a chart of the output signal waveform as a function of time and superimposed thereon are the cycles of the deuterium lamp ($D_2$), the chopper, and the electronic sampling times. Conventional sample-and-hold electronics measure the photomultiplier output at the indicated points. The background signal in the sample beam is obtained by electronic subtraction of the I signal from the $(D_2)_s + I$ signal. The background signal in the reference beam is obtained by electronic subtraction of the $I_0$ signal from the $(D_2)_R + I_0$ signal. Thus the desired signals $(D_2)_s$ $(D_2)_R$ I, $I_0$ are obtained and, with appropriate electronic processing, are employed to indicate the sample concentration. The electronic circuitry processes the pulsed waveforms but ignores steady state signals arising from sample region emission.

It will be noted from the foregoing that the continuum source 26 is pulsed on at a time when both sample and reference beams are blocked. If the continuum lamp is slightly unstable when it is first switched, the short time before the chopper opens the beams provides a period for stabilization.

It is believed that the many advantages of this invention will now be apparent to those skilled in the art. For example, true double beam operation is achieved with the added advantages of double beam background correction while sample region emission is substantially eliminated from the final readout. Furthermore, these advantages are achieved at reduced cost due to avoidance of a costly reflective chopper and substitution of a simple opaque chopper. It will also be apparent that a number of variations and modifications may be made in this invention without departing from the spirit and scope of the invention defined by the following claims.

What is claimed is:

1. An atomic absorption spectrometer which comprises: means for forming a first beam containing substantially monochromatic radiation comprising a wavelength of interest; means for forming a second beam of pulsed nonmonochromatic radiation which includes said wavelength of interest; a first beam splitter for combining the radiation of said first and second beams, splitting the combined radiation into a sample beam and a reference beam and directing them, respectively, through a sample region and a reference region; means for chopping said sample and reference beams prior to their entering said sample and reference regions; a second beam splitter for receiving and recombining said chopped beams after their leaving said sample and reference regions; means for isolating from said recombined beam a relatively narrow wavelength region containing the wavelength of interest; and means for measuring the intensity of said isolated wavelength region at periods established by the pulse rate of said second beam and the frequency of said chopping means.

2. The spectrometer of claim 1 wherein said isolating means comprises a monochromator.

3. The spectrometer of claim 1 wherein said first beam is substantially continuous.

4. The spectrometer of claim 1 wherein said chopping means comprises an opaque chopper.

5. The spectrometer of claim 4 wherein said opaque chopper is arranged to repetitively and sequentially: block both the sample and reference beams; pass one of said beams; block both said beams; and pass the other of said beams.

6. The spectrometer of claim 5 wherein said pulsed radiation forming means causes said radiation to pulse on during periods when both beams are blocked and off during periods when one beam is passed.

7. The spectrometer of claim 6 wherein said first beam is substantially continuous.

8. The method of performing atomic absorption spectroscopy which comprises: forming a first beam containing substantially monochromatic radiation comprising a wavelength of interest; forming a second beam of pulsed nonmonochromatic radiation which includes said wavelength of interest and which contains wavelengths adjacent said wavelength of interest combining the radiation of said first and second beams; splitting the combined radiation into a sample beam and a reference beam; directing the sample and reference beams, respectively, through sample and reference regions; chopping said sample and reference beams prior to their entering said sample and reference regions; recombining the chopped beams after their leaving said sample and reference regions; isolating from the recombined beam a relatively narrow wavelength region containing the wavelength of interest; measuring the intensity of the isolated wavelength region at periods established by the pulse rate of the second beam and the chopping frequency; and computing therefrom the background and spectral line intensities in both the sample and reference beams.

9. The method of claim 8 wherein said first beam is substantially continuous.

10. The method of claim 8 wherein said chopping is in the sequence: block both the sample and reference beams; pass one of said beams; block both said beams; and pass the other of said beams.

11. The method of claim 10 wherein said nonmonochromatic radiation pulses on during periods when both beams are blocked and off during periods when one beam is passed.

12. The method of claim 11 wherein said first beam is substantially continuous.

* * * * *